April 2, 1935.  E. PAPPERT  1,996,683
SPECTACLE FRONT
Filed April 8, 1933
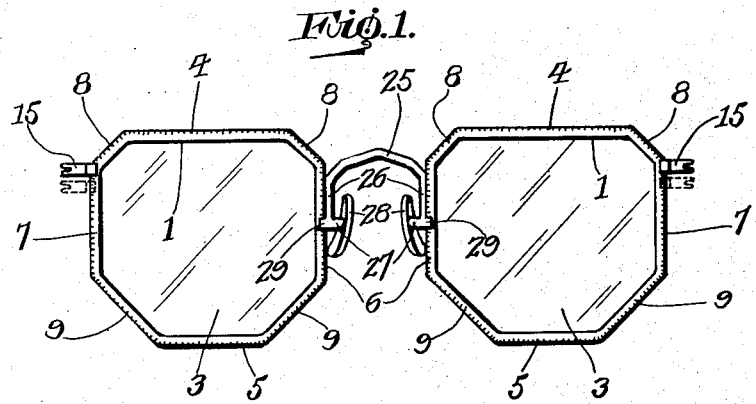
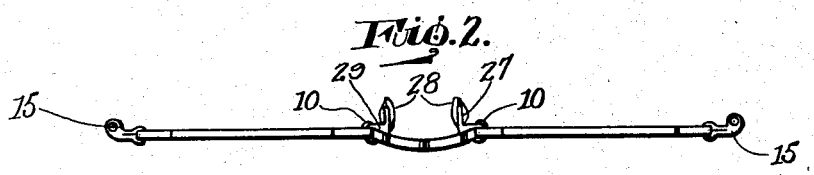
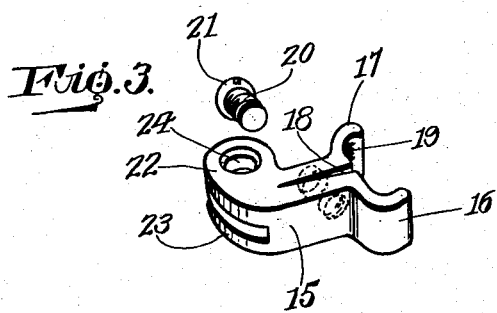
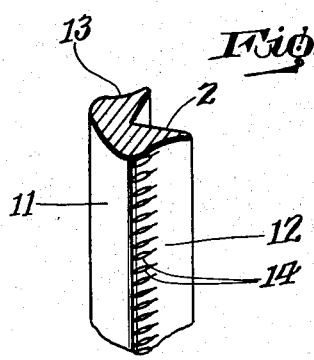
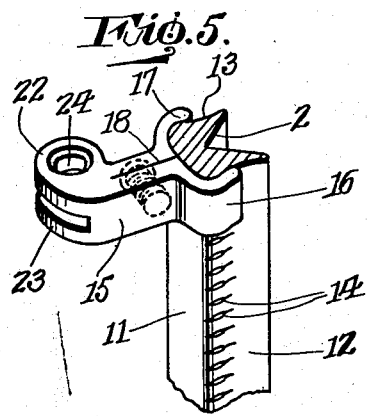
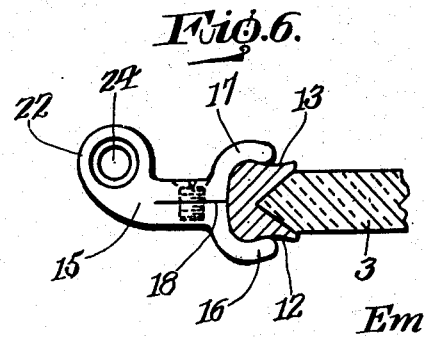
Inventor
Emanuel Pappert
By Geo. S. Kimmel
Attorney Patented Apr. 2, 1935

1,996,683

UNITED STATES PATENT OFFICE 1,996,683

SPECTACLE FRONT

Emanuel Pappert, Flushing, N. Y., assignor to The Ful-Vue Sales Company, Washington, D. C., a firm Application April 8, 1933, Serial No. 665,222

4 Claims. (Cl. 88—53)

This invention relates in general to spectacles, and more particularly has reference to a means for properly supporting the spectacles in place on the face of the wearer.

It is a well known fact that different persons are endowed with different facial characteristics and that spectacle supports, which are commonly permanently and integrally attached to the lens rims, must be adjusted for each individual according to his or her particular facial characteristics. It is also well known that the ears of different persons are differently positioned with respect to their eyes and the other parts of their faces and that spectacles having temples adapted to engage the wearer's ears must likewise be adjusted to properly position the lenses before the eyes.

These adjustments have in the past been accomplished in two ways. First, wherever possible the adjustment has been accomplished by bending the various parts of the mountings with pliers or the like provided for the purpose, and second where the adjustment is too great or of a nature such that it could not be accomplished by bending, it has been necessary to provide a number of different spectacle mountings having varying characteristics for the purpose of fitting different types of faces.

Recently also, there has come into general use a type of spectacle in which the temples and temple connections are positioned high with respect to the line of pupils of the wearer's eyes. These spectacles may be and are made in standard sizes to fit most persons. However, where a person's ears are set particularly low with respect to the eyes or where the cheek bones are especially high, these standard mountings cannot be properly fitted by merely bending the parts, because for instance, if the ears are low, the temples are given an extremely unattractive "sloping" appearance. For such persons it has therefore in the past been necessary to provide special made mountings with their attendant cost and the inconvenience involved in procuring and fitting them.

It is therefore an object of this invention to provide a means whereby the relative position of the temple connections and the attachments of the bridge or nose supports with respect to the lens rims may be readily adjusted to the requirements of various persons. It is an object to provide for such adjustment without in any way detracting from the appearance of the mountings, but instead to actually utilize an ornamental design to assist in accomplishing this purpose. By this means the necessity for special sizes and arrangements of mountings will be eliminated and a perfect fitting mounting quickly and easily produced from stock parts. It is also pointed out that by this arrangement various combinations of bridge and end-piece designs may be evolved according to the desires of the prospective wearer, thus enabling his wishes to be met without delay or prohibitive cost.

Other objects and advantages of this invention will become apparent from the following description taken in connection with the accompanying drawing, it being understood that the same are by way of example and illustration only and are not to be taken as in any way limiting the spirit or scope of this invention. The spirit and scope of this invention are to be limited only by the prior art and by the terms of the appended claims.

Referring now more particularly to the drawing in which like numerals indicate corresponding parts throughout:

Figure 1 is a front view of a spectacle front embodying this invention.

Figure 2 is a plan view of the same.

Figure 3 is a detail perspective view illustrating an endpiece constructed in accordance with this invention.

Figure 4 is a detail perspective of a section of eyewire with which the endpiece of Figure 3 is adapted to cooperate.

Figure 5 is a perspective view showing the endpiece in place on the eyewire.

Figure 6 is a view partly in section showing the device illustrated in Figure 5, with a lens in place in the eyewire.

In accordance with this invention a pair of lens rims 1 are formed of eyewire having a V-shaped groove 2 for receiving the edges of the respective lenses 3. The lens rims 1 in this instance are shown as being octagonal in shape, having substantially straight top and bottom sides 4 and 5 respectively, and substantially straight nasal and temporal sides 6 and 7 respectively. The top sides 4 are joined to the nasal and temporal sides 6 and 7 respectively by the inclined portions 8, and the bottom sides 5 are joined to the temporal and nasal sides by the inclined portions 9. The rims are split along their inner edges and joined together by suitable securing means 10.

The eyewire itself is preferably formed with a convex outer surface 11 and with slightly concave front and rear surfaces 12 and 13 respectively. Along the edges or corners of the eyewire, between the convex surface 11 and the concave surfaces 12 and 13, the eyewire is transversely scored or serrated as at 14, both for the purpose of decoration and for another purpose presently to be described.

The endpieces or temple connections 15 are each provided with a pair of clamping arms 16 and 17, the arm 16 being formed with a jaw so shaped as to fit around the front and outer portion of the eyewire and engage with in the concave surface 12. The arm 17 is likewise formed with a jaw so shaped to fit around the rear and outer portion of the eyewire and engage with in the concave surface 13. In order to enable these arms to be placed around the eyewire so that they will engage the opposite surfaces of the eyewire, the endpiece 15 is split longitudinally at 18 to form each arm with a shank part integral at one end with the body of the end piece and integral at its other end with a jaw. The endpiece is made of a slightly pliable non-resilient metal, and after being placed in position it may be bent to positively engage the arms 16 and 17 with the eyewire as shown in Figures 5 and 6. A plurality of ribs or projections 19, corresponding to the grooves or scores 14, are provided on the interior of each of the arms 16 and 17 to cooperate with these grooves and prevent the endpiece from moving up or down once it has been bent into engagement with the eyewire. A screw 20 having a head 21 is provided for firmly securing the jaws of the endpiece in closed position on the eyewire, the rear shank part of the endpiece being drilled and the front shank part of the endpiece drilled and tapped to receive it. It it noted that the screw 20 is inserted from the rear of the endpiece and that the tapped hole in the front portion does not extend through the front surface of the endpiece, so that the screw is not visible from the front. Also the split 18 is fully closed so as to be very inconspicuous.

At its outer end each endpiece 15 is provided with a conventional temple hinge connection consisting of a rearwardly extending bifurcated portion forming upper and lower ears 22 and 23 adapted to receive a temple between them. These ears have openings 24 therein adapted to receive the customary temple hinge screws.

The bridge 25 connecting the nasal edges 6 of the two lens rims, has downwardly extending legs 26, having rearwardly extending arms 27 at their lower ends. On the rear end of each arm 27 is mounted a nose pad 28 and adapted to rest against the side of the wearer's nose to support the mounting. These legs 26 are also provided with oppositely extending arms 29 adapted to be secured to the nasal sides 6 of the lens rims. These parts 29 are formed in the same manner as the inner ends of the endpieces 14 so that they may be secured to the rims in like manner.

It will be seen from the above that means has been provided whereby the endpieces 15 and the bridge 25 may each be adjustably yet firmly and easily secured to the lens rims in whatever position may be required by the characteristics of the prospective wearer. The arrangement is inexpensive and pleasing in appearance, the grooving 14 in the eyewire serving the double purpose of decorating and aiding the attachment of the various parts. It will also be seen that the other objects set forth have all been fully provided by the device above set forth.

What I claim is:—

1. In a spectacle mounting, a pair of lens rims formed of eyewire having concave front and rear surfaces adapted to receive a clamp, a bridge connecting the nasal sides of said lens rims, supporting means on said bridge adapted to support the lens rims with respect to the wearer's nose, endpieces on the temporal sides of said lenses and having temple receiving connections, and clamp means on each end of said bridge and on each of said endpieces for detachably connecting said parts to said lens rims in any desired position, said rims having serrations along their front and rear surfaces, and said clamp means having serrated surfaces adapted to engage the serrations on said rims when the clamp means is clamped in place.

2. In a spectacle mounting, a pair of lens rims formed of eyewire having concave front and rear surfaces adapted to receive a clamp, means for supporting the lenses on the face, and clamp means for detachably mounting said supporting means on said lens rims in any desired position, said rims having serrations along their front and rear surfaces, and said clamp means having serrated surfaces adapted to engage the serrations on said rims when the clamp means is clamped in place.

3. In a spectacle mounting of that type including rims serrated on their front and rear faces, a lengthwise split end piece for a temple, said end piece being formed with a pair of oppositely disposed clamping arms of less length than the length of said end piece, each of said arms consisting of a shank part and a jaw having its inner face serrated, each shank part being integral at one end with the body of the end piece and at its other end integral with a jaw, said jaws arranged at the inner end of the end piece and for overlapping the rim to provide for the serrations of the jaws engaging with the serrations on the rim, said end piece having its other end formed with a hinge-connection for a temple, said connection being spaced from said arms, and means extending through one of the shank parts and engaging within the other of said shank parts for maintaining said parts in abutting relation and for retaining said jaws in clamping engagement with the rim.

4. In a spectacle mounting, a lens rim having front and rear concave faces provided with serrations, a lengthwise split end piece for a temple, said end piece being formed with a pair of oppositely disposed clamping arms of less length than the length of said end piece, each of said arms consisting of a shank part and a jaw having its inner face serrated, each shank part being integral at one end with the body of the end piece and at its other end integral with a jaw, said jaws arranged at the inner end of the end piece and for overlapping the rim to provide for the serrations of the jaws engaging with the serrations on the rim, said end piece having its other end formed with a hinge-connection for a temple, said connection being spaced from said arms, and means extending through one of the shank parts and engaging within the other of said shank parts for maintaining said parts in abutting relation and for retaining said jaws in clamping engagement with the rim.

EMANUEL PAPPERT.